(12) United States Patent
Terry et al.

(10) Patent No.: US 11,802,625 B2
(45) Date of Patent: Oct. 31, 2023

(54) BALL DRAIN WYE STRAINER VALVE ASSEMBLY

(71) Applicant: NIBCO Inc., Elkhart, IN (US)

(72) Inventors: Andrew J. Terry, Sturbridge, MA (US); Andrew J. Coates, Westminster, MA (US); Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 425 days.

(21) Appl. No.: 16/997,250

(22) Filed: Aug. 19, 2020

(65) Prior Publication Data
US 2022/0057041 A1 Feb. 24, 2022

(51) Int. Cl.
| | |
|---|---|
| *F16K 11/22* | (2006.01) |
| *F16L 58/00* | (2006.01) |
| *F16L 41/02* | (2006.01) |
| *F16K 11/087* | (2006.01) |
| *B01D 46/00* | (2022.01) |
| *E03B 1/04* | (2006.01) |
| *F28F 25/00* | (2006.01) |

(52) U.S. Cl.
CPC .......... *F16K 11/22* (2013.01); *B01D 46/0017* (2013.01); *E03B 1/044* (2013.01); *F16K 11/0873* (2013.01); *F16K 11/0876* (2013.01); *F16L 41/021* (2013.01); *F16L 58/00* (2013.01); *F28F 2025/005* (2013.01)

(58) Field of Classification Search
CPC ............. F16K 11/0876; F16K 11/0873; B01D 46/0017; F28F 2025/005; E03B 1/044
See application file for complete search history.

(56) References Cited

U.S. PATENT DOCUMENTS

| | | | |
|---|---|---|---|
| 5,467,796 A | 11/1995 | Pettinaroli et al. | |
| 5,632,300 A | 5/1997 | Isringhausen | |
| 8,316,886 B2 * | 11/2012 | Olsen .................... | F16K 27/067 137/601.16 |
| 9,345,994 B2 | 5/2016 | Morris | |
| 10,317,097 B2 | 6/2019 | Karamanos | |
| 10,458,662 B2 | 10/2019 | Olsen et al. | |

(Continued)

FOREIGN PATENT DOCUMENTS

| | | | |
|---|---|---|---|
| CN | 208049492 U | * | 11/2018 |
| EP | 1681520 | | 7/2006 |

(Continued)

OTHER PUBLICATIONS

CN-208049492-U Translation.*

(Continued)

*Primary Examiner* — Atif H Chaudry
(74) *Attorney, Agent, or Firm* — PRICE HENEVELD LLP (57) ABSTRACT

A ball drain wye strainer valve assembly includes a wye strainer located adjacent to a T-ball valve within a unitary body. The ball drain wye strainer valve assembly includes an additional valve member. The combination of the valve members permits the flushing of the wye strainer screen from either upstream or downstream. A drain is also incorporated to allow for the system draining, flushing, or air-purging during the initial installation and subsequent maintenance of the screen and wye strainer.

17 Claims, 6 Drawing Sheets

(56) References Cited

U.S. PATENT DOCUMENTS

2014/0261848 A1* 9/2014 Roden .................. F16L 41/03
　　　　　　　　　　　　　　　　　　　251/315.01

FOREIGN PATENT DOCUMENTS

JP　　　　3014633　　　8/1995
KR　　20030015169 A　*　11/2002

OTHER PUBLICATIONS

Henry Technologies, Product Catalogue, www.henrytech.com (Apr. 2016).

Johnson Controls, "PP1 Series Piping Packages for VG1000 Series Ball Valves," Product Bulletin (Jan. 2020).

* cited by examiner

BALL DRAIN WYE STRAINER VALVE ASSEMBLY

BACKGROUND OF THE INVENTION

The present invention relates to wye (Y) strainers. Wye strainers utilize screens to strain debris from a fluid passageway in a plumbing system and/or heating system. The wye strainer is designed to protect downstream appliances and other components in the overall system from debris, such as sediment. The screen of the wye strainer will typically cover all of the fluid passageway to screen debris from the fluid, allowing it to fall into a trap area, while permitting the screened fluid to continue further downstream of the wye strainer. The screen of the wye strainer can lose functionality and/or operate to slow the flow of the fluid in the passageway as the openings in the screen become clogged or otherwise blocked due to sediment or minerals in the fluid as the fluid passes through the screen. Thus, the screens of wye strainers need to be serviced and/or replaced.

Typically, the cleaning and/or replacement of a screen in a wye strainer requires the shutdown of the entire plumbing/heating system and/or multiple valves within the system in order to remove a plug on the trap. This can be inconvenient and can easily add air into the plumbing system when the fluid pressure of the entire plumbing system needs to be released in order to service the screen in the wye strainer. In addition, many of the components which form the fluid passageway on both sides of the wye strainer can create potential leak paths, both before and after the wye strainer.

An improved valve assembly that eliminates a number of potential leak paths, as well as providing the ability to isolate, drain, flush, and purge a plumbing and/or heating system and to service the screen in a wye strainer is described herein.

SUMMARY OF THE INVENTION

One aspect of the present invention is a ball drain wye strainer valve assembly. The ball drain wye strainer valve has a unitary body with a fluid passageway defined by a first section, a second section, and a third section. The first section is generally perpendicular to the second section, creating a tee portion in the unitary body at a first intersection in the unitary body. The first section of the unitary body has a first port. The second section of the unitary body has a second port and a third port on opposite sides of the first intersection in the unitary body. The third section angularly intersects the second section adjacent to the first section in the unitary body. The angular intersection of the third section and the second section creates a second intersection that is located in the fluid passageway between the first intersection and the third port. The third section has a fourth port. The fluid passageway includes a diversion member in the second intersection angled to direct fluid leaving the first intersection toward the third section. A first valve member is located at the first intersection of the unitary body, permitting flow from the second port into the first intersection and out of the third port when the first valve member is in a first position. The first valve member will close the fluid passageway between the second port and the first intersection when the first valve member is in a second position. The first valve member will close the fluid passageway between the first intersection and the second intersection when the first valve member is in a third position.

Another aspect of the present invention is a ball drain wye strainer valve assembly having a unitary body with a fluid passageway defined by a first section, a second section, and a third section. The first section is generally perpendicular to the second section creating a tee in the fluid passageway at the first intersection in the fluid passageway. The first section has a first port, while the second section has a second and a third port on opposite sides of the first intersection of said unitary body. The third section intersects the second section at an angle adjacent to the first intersection creating a second intersection that is located in the fluid passageway between the first intersection and the third port. The third section includes a screen within the fluid passageway. A first valve member is located at the first intersection in the unitary body.

Yet another aspect of the present invention is a ball drain wye strainer valve assembly with a unitary body having a fluid passageway defined by a first section, a second section, and a third section. The first section intersects the second section creating a first intersection in the fluid passageway. The first section has a first port, while the second section has a second port and a third port on opposite sides of the first intersection in the fluid passageway. The third section intersects the second section at an angle, adjacent to the first intersection, creating a second intersection in the fluid passageway. The third section has a fourth port. The fluid passageway includes a diversion member in the second intersection. A first valve member is located in the first intersection in the unitary body, and a second valve member located in the first section between the first valve member and the first port.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in Figures. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
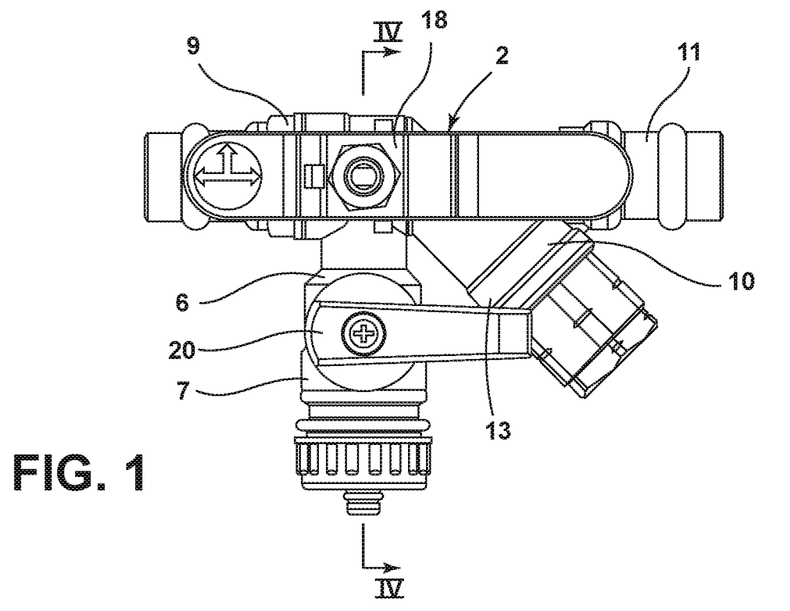
FIG. 1 is a front view of a ball drain wye strainer valve assembly embodying one aspect of the present invention.
Figure 2:
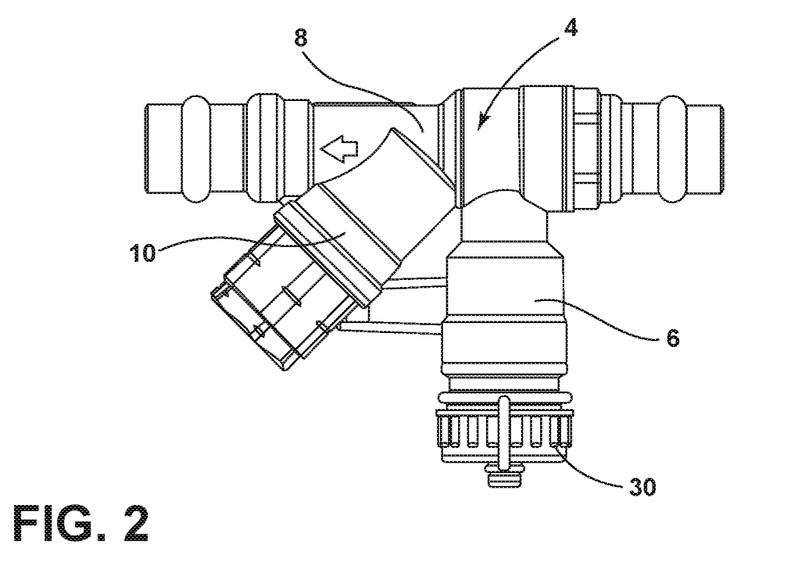
FIG. 2 is a rear view of the ball drain wye strainer valve assembly shown in FIG. 1.

A ball drain wye strainer valve assembly 2 is illustrated in FIG. 1. The ball drain wye strainer valve assembly 2 includes a body 4 with a fluid passageway 5. The body 4 has a first section 6, a second section 8, and a third section 10. The first section 6 is generally perpendicular to the second section 8. The intersection of the first section 6 and the second section 8 creates a tee in body 4. The intersection of the first section 6 and the second section 8 also creates a first intersection 12 in the fluid passageway 5 in body 4. The third section 10 angularly intersects the second section 8 of the body 4 adjacent to the first intersection 12 in the fluid passageway 5. The intersection of the third section 10 and the second section 8 creates a second intersection 14 in the fluid passageway 5. The angle at which the third section 10 intersects the second section 8 can be between 30° and 60° and more preferably about 45°.

The fluid passageway 5 includes a diversion member 16 located in the second intersection 14 in the fluid passageway 5. The diversion member 16 diverts fluid leaving the first intersection 12 in the fluid passageway 5 of the body 4 angularly down toward the third section 10.

The first section 6 of the body 4 has a first port 7. The second section 8 of the body 4 has a second port 9 and a third port 11. As shown in the illustrated embodiments, the second port 9 is located on one side of the first intersection 12, and the third port 11 is located on the other side of the second intersection 14 in the fluid passageway 5 of the body 4. The third section 10 of body 4 has a fourth port 13.

Figure 3:
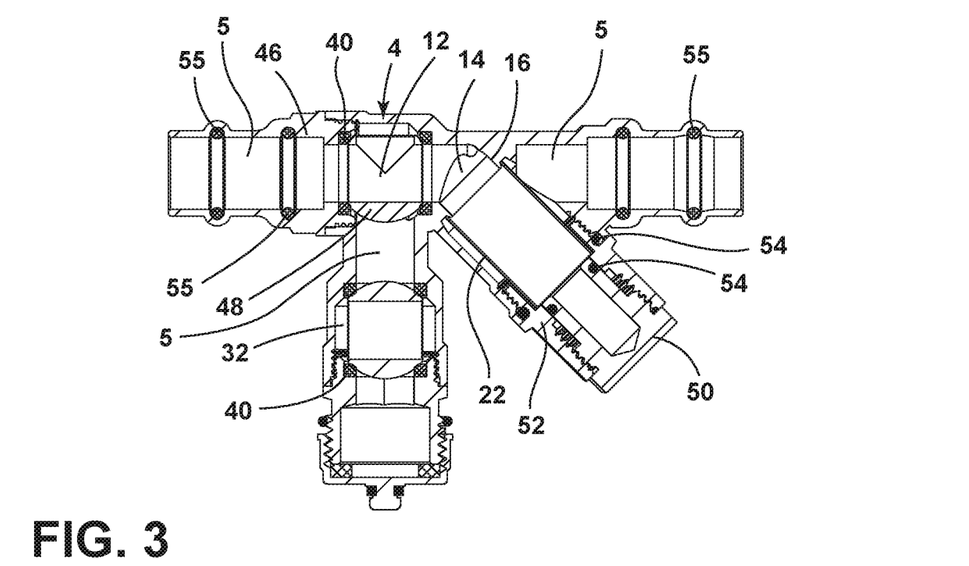
FIG. 3 is a cross-sectional view of the ball drain wye strainer valve assembly shown in FIG. 4, taken along line III-III.

A screen 22 is positioned within the third section 10 of body 4 to create a wye strainer. As illustrated in FIG. 3, the screen 22 can include an end that is adjacent to or contacting the diversion member 16. In that manner, most if not all fluid exiting the second intersection 14 in the fluid passageway 5 must pass through the screen 22 before moving toward third port 11. The screen 22 will screen the fluid and depending upon the size of the openings in the screen 22, will remove certain sized particulate matter from the fluid in the fluid passageway 5. The size of the openings in the screen 22 can be varied depending upon the desired filtration level.

The screen 22 can be removed from the body 4 for cleaning and/or replacement. The screen 22 is removed from the third section 10 of the body 4 by removal of the third bonnet 52. The third bonnet 52 is coupled to the fourth port 13. In the illustrated embodiment, the third bonnet 52 has male threading, which is received by the female threading in the fourth port 13 of the third section 10 of body 4. O-rings 54 can be used to seal the coupling between the third bonnet 52 and the fourth port 13 in third section 10. The third bonnet 52 can include a plug 50, as illustrated in FIG. 3. The plug 50 can include male threading 31 that is coupled to female threading in third bonnet 52. O-rings 54 can be used to seal the coupling of the plug 50 to the third bonnet 52. The removal of the plug 50 can drain the third section 10, removing collected particulate material, without removing the screen 22. The screen 22 can be removed for cleaning and/or replacement by removal of the entire third bonnet 52 from fourth port 13.

Figure 4:
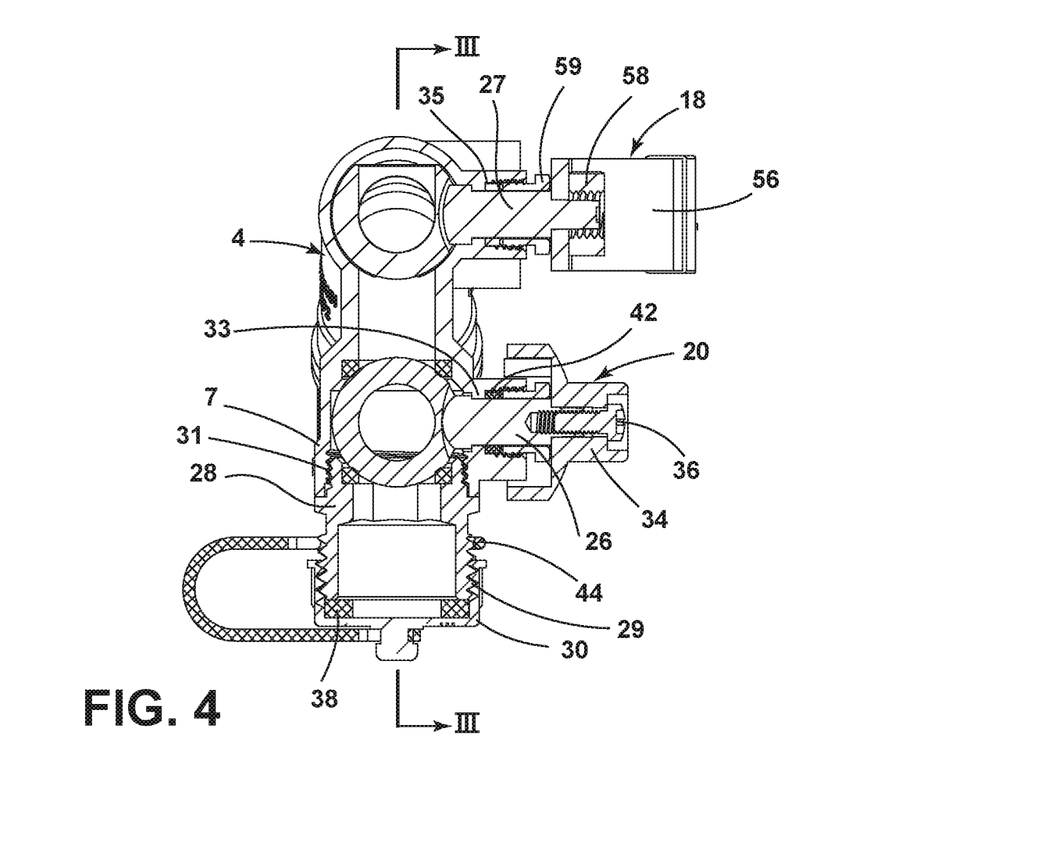
FIG. 4 is a cross-sectional view of the ball drain wye strainer valve assembly shown in FIG. 1, taken along section IV-IV.
Figure 5:
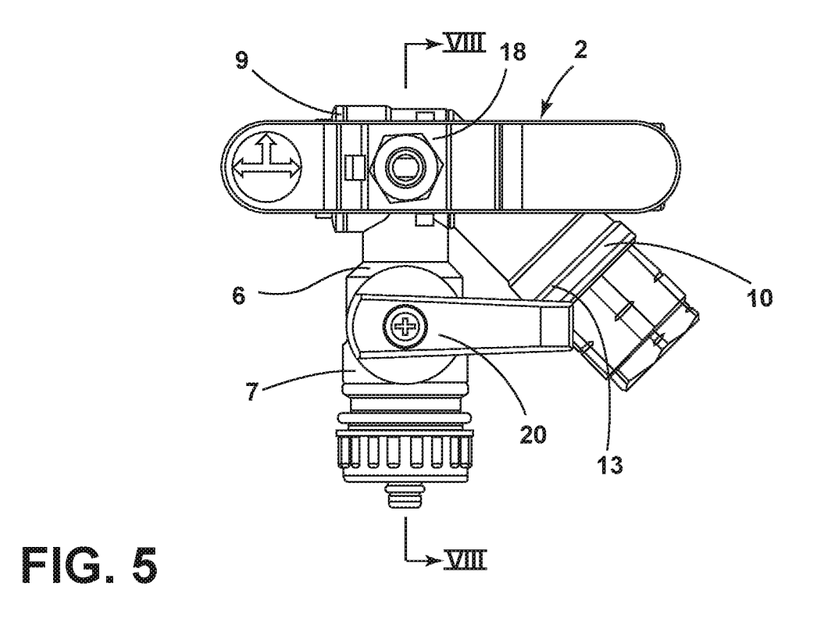
FIG. 5 is a front view of another embodiment of a drain way strainer valve.
Figure 6:
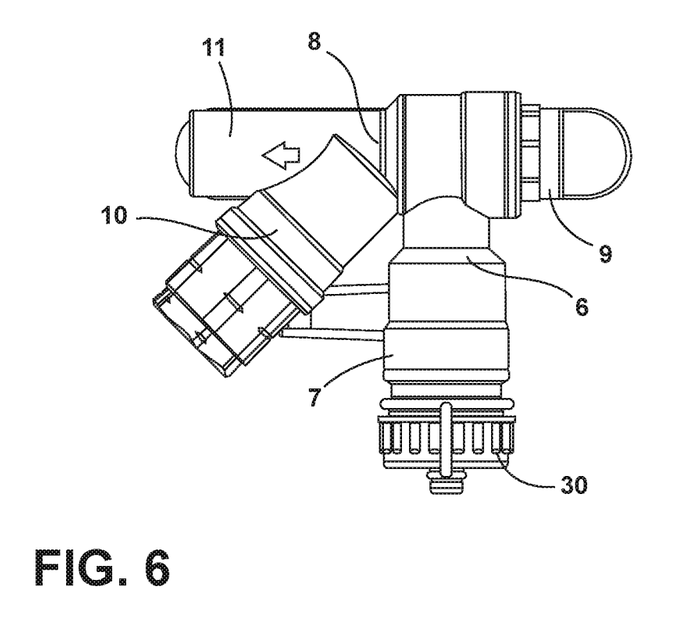
FIG. 6 is a rear view of the ball drain wye strainer valve assembly shown in FIG. 5.

The first port 7 can include a first bonnet 28, as shown in FIG. 4. The first bonnet 28 includes male threading 31 that is received by female threading in the first port 7. O-rings or other sealing material may be used to seal the coupling between the first bonnet 28 and the first port 7 in body 4. The first bonnet 28 also includes male threading 29 for receiving a cap 30, as illustrated in FIG. 4. The cap 30 can include a gasket 38 to help seal the coupling between the cap 30 and the first bonnet 28. A connecting coil 44 may be connected to the cap 30 to prevent loss of the cap 30 during servicing operations. The male threading 29 on the first bonnet 28 can be garden hose threads to connect a garden hose for draining or pumping fluid into the system. Other embodiments can include different types of connections on first bonnet 28.

Figure 7:
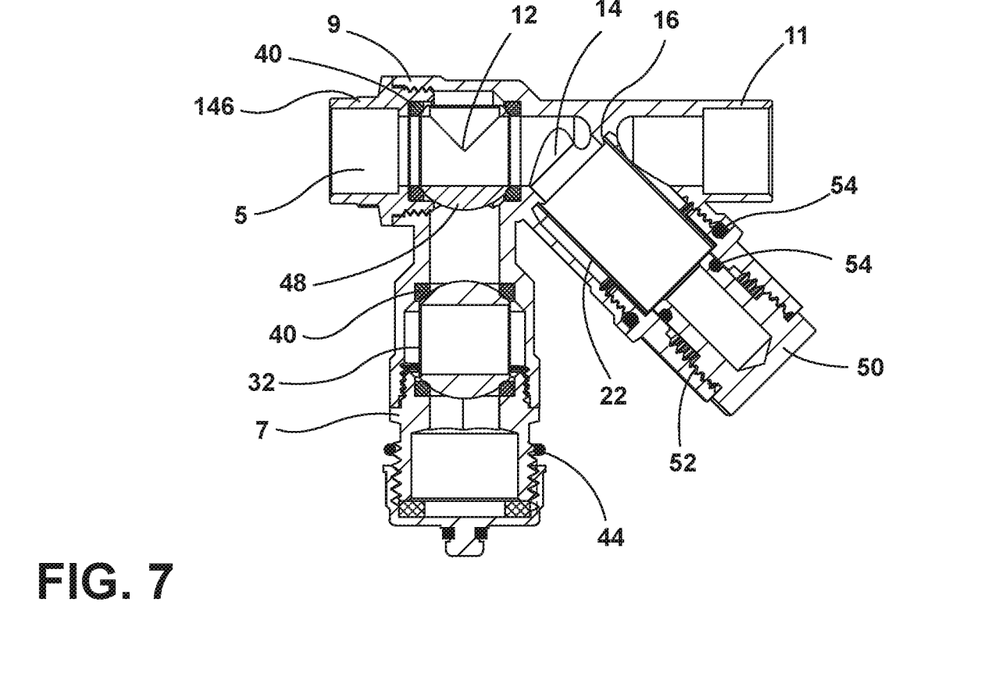
FIG. 7 is a cross-sectional view of the ball drain wye strainer valve assembly shown in FIG. 8, taken along section VII-VII.
Figure 8:
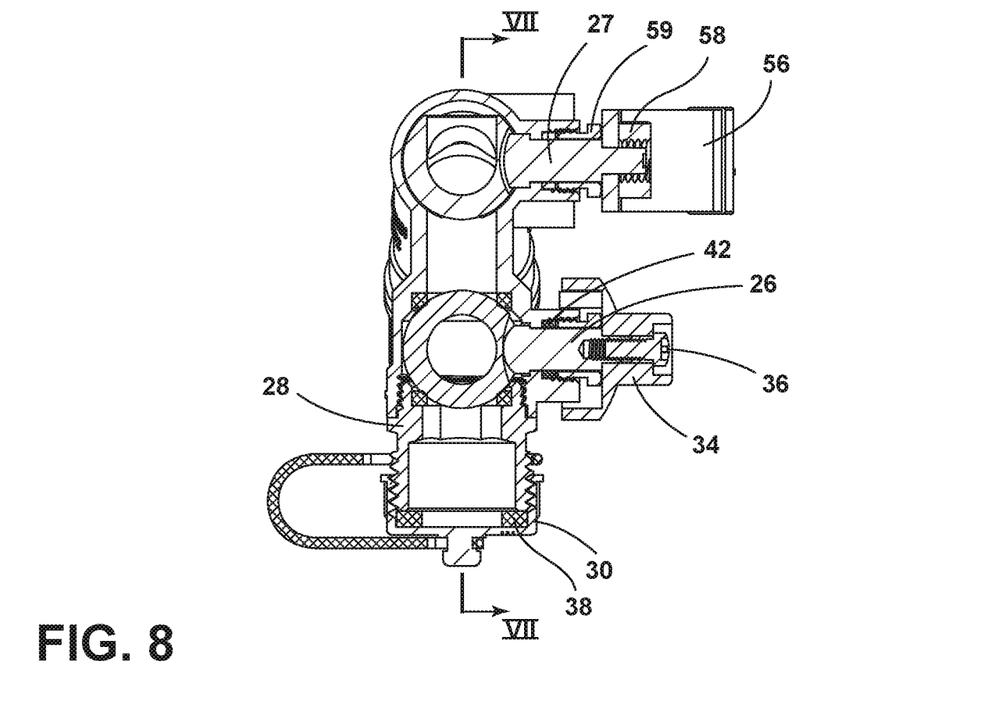
FIG. 8 is a cross-sectional view of the ball drain wye strainer valve assembly shown in FIG. 5, taken along section VIII-VIII.
Figure 9:
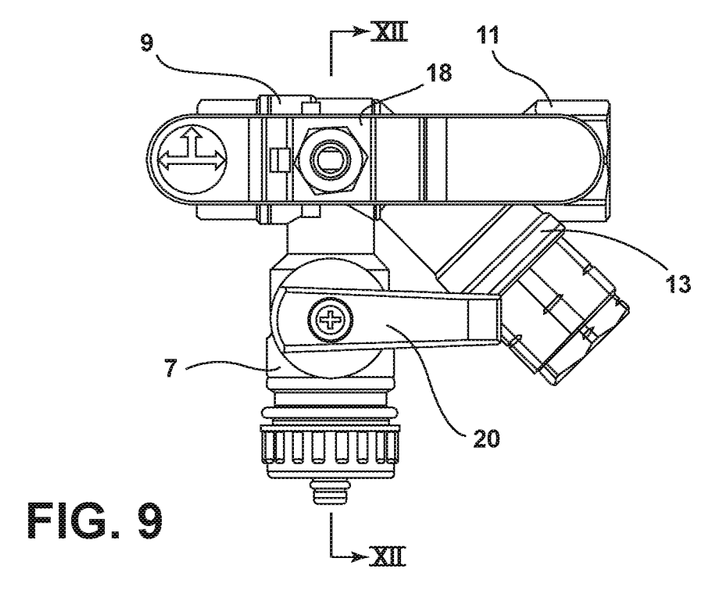
FIG. 9 is a front view of another embodiment of a drain wye strainer valve.
Figure 10:
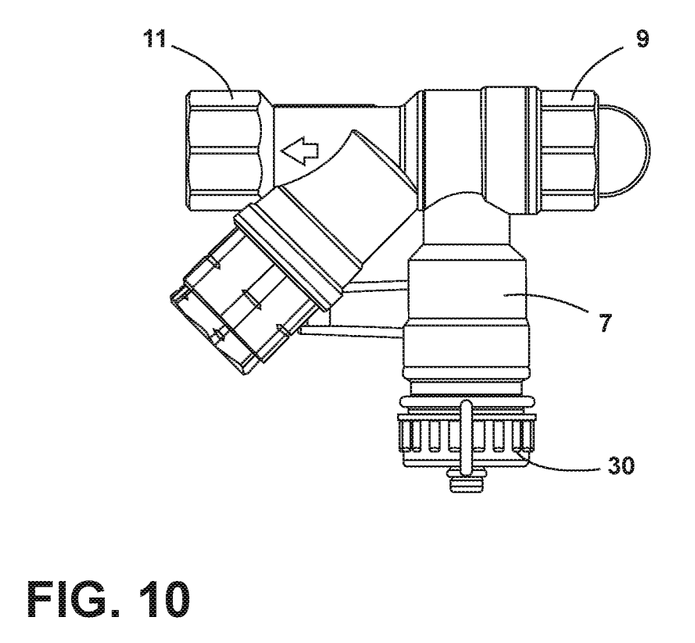
FIG. 10 is a rear view of the ball drain wye strainer valve assembly shown in FIG. 9.
Figure 11:
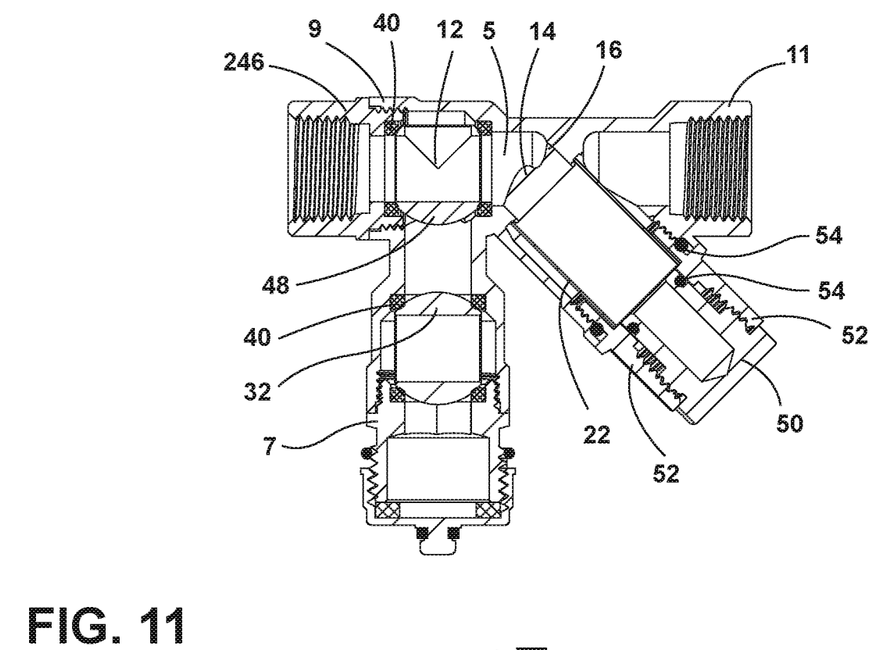
FIG. 11 is a cross-sectional view of the ball drain wye strainer valve assembly shown in FIG. 12, taken along section XI-XI.
Figure 12:
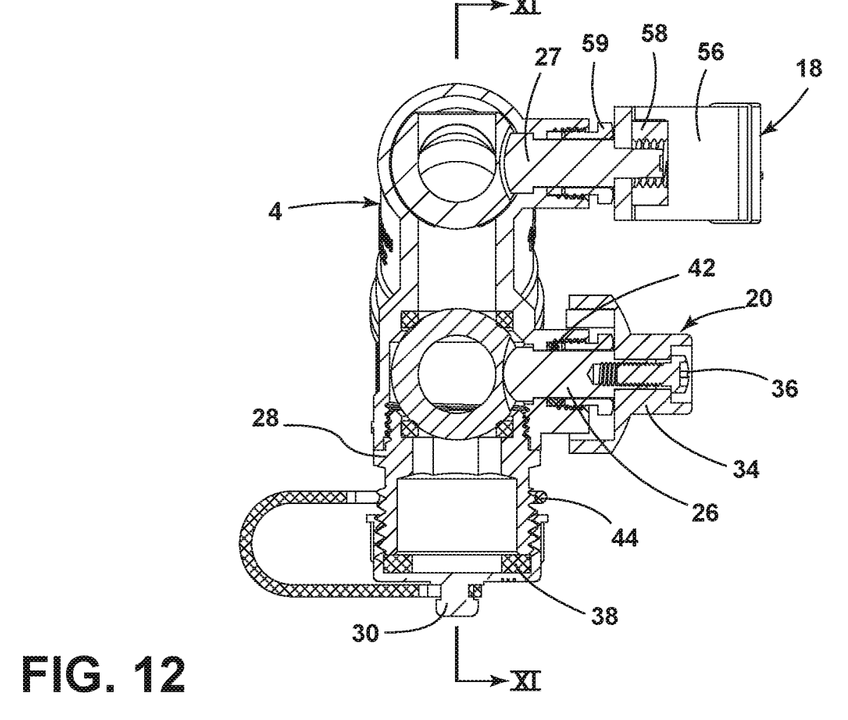
FIG. 12 is a cross-sectional view of the ball drain wye strainer valve assembly shown in FIG. 9, taken along section XII-XII.

The second port 9 can be coupled to copper pipe, PEX tubing, or other types of pipe and/or tubing in a plumbing and/or heating system. Thus, the second port 9 can include a variety of configurations for different types of coupling. The different types of coupling can be press-fit, push-to-connect, sweat, PEX, crimp, male NPT, female NPT, or other conventional couplings. FIG. 3 illustrates a second bonnet 46 that includes male threading to be received in female threading in second port 9. The second bonnet 46 includes O-rings 55 for a press fitting to the pipe or tubing of the plumbing system. FIG. 7 illustrates a different second bonnet 146 that can be used for a sweat connection to plumbing pipes or tubing. FIG. 11 illustrates a third version of the second bonnet 246 that has a female NPT threading.

Similarly, the third port 11 can be used in a variety of couplings to piping and/or tubing. The couplings can include press-fit, push-to-connect, sweat, PEX, crimp, male NPT, female NPT, or other conventional couplings. FIG. 3 illustrates a third port 11 with press coupling utilizing O-rings 55. FIG. 7 illustrates a third port 11 than can be used in a sweat coupling. FIG. 11 illustrates a third port 11 with a female NPT coupling. While the illustrated embodiments show second port 9 and third port 11 with similar types of couplings, the couplings used in the second port 9 and third port 11 can be different.

A first valve member 18 is used at the first intersection 12 in the fluid passageway 5 of body 4. In the illustrated embodiment, the first valve member 18 is a three-way ball valve. Specifically, the first valve member 18 is a T-ball valve that will close or open the fluid passageway 5 at the first intersection 12 in three different positions. In the first position, illustrated, for example, in FIGS. 1, 3, and 4, the first valve member 18 permits flow from the second port 9 into the first intersection 12, through second intersection 14 and out of third port 11. In the second position, rotated 90° clockwise from the first position, the first valve member 18 will block the flow of fluid from the second port 9 into the first intersection 12, but will leave a flow path between the second valve member 20 and the second intersection 14 and third port 11. In a third position, rotated 90° counterclockwise from the first position, the first valve member 18 will permit the flow of fluid from the second port 9 to the first intersection 12 and toward the second valve member 20 and first port 7, but will block the flow of fluid from the first intersection 12 toward the second intersection 14 and third port 11.

The T-ball valve of the first valve member 18 can provide other flow paths and/or sequences of flow paths depending upon the orientation of the handle to the first valve member 18.

The first valve member 18 includes a handle 56 that is coupled to stem 27 that is positioned in the first valve member opening 35 in body 4. A nut 58 can be used to help secure the handle 56 to the stem 27. The stem 27 can include packing to help seal between the stem 27 and the first valve member opening 35 in the body 4. The ball 48 of the first valve member 18 is positioned within the first intersection 12 of fluid passageway 5 and seat 40 to help seal the ball 48 to surfaces within the fluid passageway 5 of body 4. The seat 40 is located between the second flow port 9 and first intersection 12 and between the first intersection 12 and second intersection 14.

A second valve member 20 is positioned in the first section 6 between the first valve member 18 and the first port 7. The illustrated second valve member 20 is a two-way ball valve that opens and closes the fluid passageway 5 between the first intersection 12 and the first port 7. A fastener 36 is threadedly received into a stem 26 that is positioned in the second valve member opening 33 in the body 4. The handle 34 is secured to the ball drain wye strainer valve assembly 2 when the fastener 36 is coupled to the stem 26. The stem 26 can include packing 42 to help seal between the stem 26 and the second valve member opening 33 and the body 4. The stem 26 connects to the ball 32 that is positioned within the fluid passageway 5. A seat 40 can help seal the ball 32 to the fluid passageway 5.

The first valve member 18 and the second valve member 20 can be used to isolate, drain, flush, and/or purge the ball drain wye strainer valve assembly 2. When the first valve member 18 is in its third position, the flow of fluid from the first intersection 12 is blocked to the second intersection 14. The plug 50 can be removed from the third bonnet 52 to drain and collect the particulate matter collected by the screen 22 in the third section 10. Alternatively, the entire third bonnet 52 can be removed to clean and/or replace the screen 22.

When the first valve member 18 is in its third position, the second valve member 20 can be in a closed position, thereby closing the plumbing system at the first intersection 12. However, the second valve member 20 can be opened to permit the flow of fluid to the first port 7. This can be used to bypass the screen 22, third section 10, and third port 11.

When the first valve member 18 is in its second position, the flow of fluid is stopped before entering the first intersection 12. Thus, the plug 50 can be removed to drain and/or collect the particulates collected within the third section 10 and/or the second valve member 20 can be opened to drain the overall ball drain wye strainer valve assembly 2. The draining of the wye strainer valve assembly 2 through the first port 7 before service of the screen 22 can release the pressure in the wye strainer valve assembly 2 making it easier to service the screen 22.

When the first valve member 18 is in its first position, the flow of fluid will go from the second port 9 to the first intersection 12 to the second intersection 14, through screen 22, and the screened fluid will then be able to enter and exit the third port 11.

The screen 22 can be flushed from either upstream or downstream, depending upon the position of the first valve member 18 and the second valve member 20. The screen 22 can be flushed from downstream of the screen 22 when the first valve member 18 is in the third position. The screen 22 can be flushed from upstream of the screen 22 when the first valve member 18 is in its first position.

The body 4 is a unitary piece. The body 4 can be made of any suitable material, including polymeric or metal material. In the illustrated embodiments, the body 4 is made from a metallic material, such as brass. The brass can be a lead-free brass that can be coated and/or surface treated.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A ball drain wye strainer valve assembly, comprising:
a unitary body having a fluid passageway defined by a first section, a second section, and a third section, wherein:
said first section is generally perpendicular to said second section, creating a tee portion in said unitary body at a first intersection in said unitary body;
said first section having a first port located opposite said first intersection;
said second section having a second port and a third port on opposite sides of said first intersection of said unitary body;
said third section angularly intersecting said second section adjacent to and on the same side as said first section, creating a second intersection that is located in said fluid passageway in said second section between said first intersection and said third port;
said third section having a fourth port; and
said fluid passageway including a diversion member in said second section of said second intersection angled to direct fluid leaving said first intersection toward said third section;
a first valve member located in said second section at said first intersection of said unitary body, permitting flow from the second port into the first intersection and out the third port when said first valve member is in a first position, closing the fluid passageway between said second port and the first intersection when said first valve member is in a second position, and closing the fluid passageway between the first intersection and the second intersection when said first valve member is in a third position;
a screen positioned in said fluid passageway in a portion of said third section; and
a second valve member located in said first section between said first port and said first intersection, opening the fluid passageway to said first port when said second valve member is in a first position and closing the fluid passageway to said first port when said second valve member is in a second position.

2. The ball drain wye strainer valve assembly of claim 1, wherein said first valve member is a T-ball valve.

3. The ball drain wye strainer valve assembly of claim 1, wherein said unitary body is made from brass.

4. The ball drain wye strainer valve assembly of claim 1, including a plug coupled to said fourth port.

5. The ball drain wye strainer valve assembly of claim 1, including a bonnet coupled to said second port.

6. The ball drain wye strainer valve assembly of claim 1, including a cap coupled to said first port.

7. The ball drain wye strainer valve assembly of claim 1, wherein the angle of the intersection between the third section and second section in the fluid passageway is approximately 45°.

8. A ball drain wye strainer valve assembly, comprising;
a unitary body having a fluid passageway defined by a first section, a second section, and a third section, wherein:
said first section is generally perpendicular to said second section creating a tee in the fluid passageway at the first intersection in the fluid passageway;
said first section having a first port located opposite said first intersection;
said second section having a second and a third port on opposite sides of said first intersection of said unitary body;
said third section intersecting said second section on the same side as said first section at an angle adjacent to said first intersection creating a second intersection that is located in the fluid passageway in said second section between said first intersection and said third port;
said third section including a screen within the fluid passageway;
a first valve member located at said first intersection of said unitary body; and
a second valve member in said first section between said first valve member and said first port.

9. The ball drain wye strainer valve assembly of claim 8, including a diversion member in said second section at said second intersection angled to direct fluid toward said third section.

10. The ball drain wye strainer valve assembly of claim 8, wherein said first valve member permits flow from the second port into the first intersection and through the second intersection when said first valve member is in a first position, closes the fluid passageway from said second port to said first intersection when said first valve member is in a second position, and closes the fluid passageway from said first intersection to said second intersection when said first valve member is in a third position.

11. The ball drain wye strainer valve assembly of claim 10, wherein said first valve member is a T-ball valve.

12. The ball drain wye strainer valve assembly of claim 11, wherein said unitary body is made from a brass containing material.

13. The ball drain wye strainer valve assembly of claim 8, wherein said second port includes a press fitting.

14. The ball drain wye strainer valve assembly of claim 13, wherein said third port includes a press fitting.

15. A ball drain wye strainer valve assembly, comprising:
a unitary body having a fluid passageway defined by a first section, a second section, and a third section, wherein:
said first section intersects said second section creating a first intersection in said fluid passageway;
said first section having a first port located opposite said first intersection;
said second section having a second port and a third port on opposite sides of said first intersection in said third passageway;
said third section intersects said second section on the same side as said first section, at an angle adjacent to said first intersection creating a second intersection in said fluid passageway in said second section;
said third section having a fourth port; and
said fluid passageway including a diversion member in said second section at said second intersection;
a first valve member located in said first intersection in said unitary body; and
a second valve member located in said first section between said first valve member and said first port.

16. The ball drain wye strainer valve assembly of claim 15, wherein said first valve member is a T-ball valve.

17. The ball drain wye strainer valve assembly of claim 15, further including a strainer in the fluid passageway of said third section.

\* \* \* \* \*